United States Patent [19]
Bruner

[11] 3,843,601
[45] Oct. 22, 1974

[54] HYDRAULIC ELASTOMER
[75] Inventor: Leonard Bretz Bruner, Manchester, Mich.
[73] Assignee: Stauffer Chemical Company, Westport, Conn.
[22] Filed: Oct. 11, 1973
[21] Appl. No.: 405,349

[52] U.S. Cl. ................ 260/46.5 G, 260/46.5 UA, 260/448.2 Q
[51] Int. Cl. ......................................... C08f 11/04
[58] Field of Search ............ 260/46.5 UA, 46.5 G, 260/448.2 Q

[56] References Cited
UNITED STATES PATENTS
2,867,599  1/1959  Hurd et al. ................. 260/46.5 UA
3,652,711  3/1972  Triem et al. ................ 260/46.5 UA Primary Examiner—Melvyn I. Marquis

[57] ABSTRACT

A silicone elastomer that flows like a fluid under high pressure is described. It is made by heating a silicone fluid, having a molecular weight close to 60,000 and containing approximately 0.45 mole percent of methylvinylsiloxane units, with a vinyl-specific peroxide. This elastomer is characterized by a combination of a high cross-link density and a high proportion of free chain ends. It crumbles to a powder under high shear stress, but has the unique property of flowing like a viscous fluid through a narrow orifice. It is useful in hydraulic impact absorbers and other hydraulic systems.

21 Claims, No Drawings

HYDRAULIC ELASTOMER

This invention relates to silicone elastomers suitable for hydraulic systems, and to a method for preparing the same.

Silicone fluids have been used in hydraulic shock absorbers because of their ability to dissipate energy by flowing through an orifice. They have the disadvantage that they must be used in closed systems to avoid loss by gravity. Even the smallest leak will permit deterioration over a period of time. Nevertheless, up till now no other materials have been found suitable in such application.

It is true that elastomers and other materials have some impact-absorbing ability because of their ability to absorb energy by elastic deformation. It is also true that most elastomers can be forced through an orifice if subjected to enough pressure. In the process, however, all previously known elastomers become so thoroughly degraded that they can not be used a second time in the same system. The degradation is to some extent a mechanical breakdown from the high shear stress involved, but mainly it is chemical degradation caused by the high temperatures generated.

Silicone elastomers are desirable materials for such an application because of their high thermal stability. Also they have a high compressibility, which tends to smooth out peaks in the stress-strain curve. However, none of those known heretofore have been suitable. They can be forced through an orifice, thereby being broken down into small particles, but these are relatively hard and do not easily flow back into their original position. Oil has been added as a plasticizer to overcome these disadvantages; however, it has not been very successful, since the oil bleeds from the elastomer and eventually leaks out of the system.

It is therefore, an object of this invention to provide a hydraulic elastomer. Another object of this invention is to provide a cross-linked silicone elastomer that is easily deformed under pressure and that breaks down into soft particles under high shear, said particles having the property of flowing under pressure, but not under the influence of gravity alone. Still another object of this invention is to provide a silicone fluid that is curable to such an elastomer. A further object of this invention is to provide a method for curing said fluid to said elastomer.

The foregoing objects, and others which will become apparent from the following description are accomplished in accordance with this invention, generally speaking, by preparing a vinyl-containing silicone fluid having a specified range of molecular weight and vinyl content and thereafter heating it with a vinyl-specific peroxide.

Silicone fluids that may be used in the practice of this invention are linear siloxane copolymers having the general formula $$RO[(CH_3)_2SiO]_x[CH_3(C_2H_3)SiO]_yR$$

in which R is an alkyl radical of from one to four carbon atoms, hydrogen or a trimethylsilyl radical, $x$ is a number of from about 270 to 2,700 and $y$ is a number of from $0.001x$ to $0.009x$. Generally these silicone fluids contain predominately, dimethylsiloxane units with small amounts of methylvinylsiloxane units. The end groups may be trimethylsiloxy, hydroxy or alkoxy groups; however, for optimum viscosity control, the trimethylsilyloxy groups are preferred.

The molecular weight may vary between about 20,000 and 200,000, corresponding with viscosities between 1000 and 1,000,000 centipoises (cp) at 25°C.

The amount of methylvinylsiloxane units may vary from about 0.1 to about 0.9 mole percent. The optimum amount varies inversely with the chain length. Specifically, the optimum methylvinylsiloxane content is given by the relation:

$$\text{"Vinyl"} = 100y/x + y = 4.8/\log V - 0.73 \qquad (1)$$

Here "Vinyl" is mole percent of methylvinylsiloxane, and V is the viscosity in cp. "Vinyl" may be as much as 0.05 mole percent lower or 0.10 mole percent higher without departing from the optimum range. In mathematical terms, then, the optimum range is given by the relation:

$$\text{"Vinyl"} = 4.8/\log V - C \qquad (2)$$

where C may vary between 0.63 and 0.78. Small departures from the optimum range are permissible, but in any case C should be between 0.53 and 0.83.

As indicated above the viscosity of the fluid may be as low as 1000 cp. However, even with the optimum vinyl content it is found that the ultimate properties of the cured elastomers are not as good as when the viscosity of the fluid is at least 5,000 cp. That is, the hardness of the elastomer and its resistance to flow are below the desired range.

Good physical properties in the elastomer are obtained if the viscosity of the fluid approaches 1,000,000 cp. However, the vinyl content has to be so low that control of the degree of cross-linking becomes difficult. Furthermore, fluids with viscosities above 30,000 cp are difficult to handle. They are too viscous to pour easily and too fluid to be handled like a silicone gum, which generally has a viscosity of around 30,000,000 cp.

The preferred range is thus between a viscosity of from 5000 cp, with 0.57 mole percent "Vinyl," to 30,000 cp, with 0.34 mole percent "Vinyl." The optimum range is from 10,000 to 15,000 cp with about 0.45 mole percent of methylvinylsiloxane and a molecular weight of about 60,000.

The fluids of this invention may be prepared by any conventional method known in the art for preparing silicone polymers, such as condensation of short-chain hydroxy-terminal polymers, acid-catalyzed equilibration and base-catalyzed equilibration. In a base-catalyzed equilibration a mixture of cyclic oligomers of dimethylsiloxane, cyclic oligomers containing methylvinylsiloxane, alone or in combination with dimethylsiloxane, and a short-chain siloxane containing trimethylsiloxy end groups is heated to a temperature of from 80° to 90°C. with a fugitive catalyst such as tetramethylammonium hydroxide. After 1 to 2 hours the temperature is increased to 130° to 150°C. to destroy the catalyst. If desired, volatile by-products can then be removed by further heating under vacuum. The tetramethylammonium siloxanolate described in U.S. Pat. No. 3,433,765 is an excellent fugitive catalyst for the equilibration.

The choice of peroxide used for curing is important. Peroxides that generate acyloxy radicals, especially diacyl peroxides such as benzoyl peroxide, are relatively undersirable because they are strong hydrogen abstractors. The degree of cross-linking is determined largely by the amount of peroxide and the temperature employed in the vulcanization.

Vinyl-specific peroxides, on the other hand, generate cross-links through the vinyl groups, and the degree of cross-linking depends primarily on the number of vinyl groups. Vinyl-specific peroxides are characterized by the fact that their initial decomposition products are principally tertiary alkoxy radicals.

One class of vinyl-specific peroxides consists of tertiary alkyl peroxides. The simplest members of this class, such as tertiary butyl peroxide and tertiary amyl peroxide, are chemically satisfactory but too volatile for long-term storage. Thus it is desirable to use peroxides having very low volatility at room temperature. For this reason it is preferred that the molecules have at least 14 carbon atoms, as in dicumyl peroxide.

Peroxides with two or more peroxy groups are often preferred. These include peroxides such as bis-(t-butylperoxyisopropyl)-benzene, bis-(t-butylperoxyisopropyl)-ethane, and bis-(t-butylperoxyisopropyl)-acetylene. These are tertiary alkyl peroxides in the sense that every peroxidic oxygen atom is attached to a tertiary carbon atom.

Another class of suitable vinyl-specific peroxides may be described as diperoxy ketals. Suitable examples of these are 1,1-di-t-butylperoxy-3,3,5-trimethylcyclohexane and n-butyl 4,4-di-t-butylperoxyvalerate.

All of the specific peroxides enumerated above, as well as other tertiary alkyl peroxides and diperoxy ketals, may be used in the practice of this invention. Bis-(t-butylperoxyisopropyl)-benzene (mixed meta and para isomers) has a particular advantage in that its activity is easily monitored by ultraviolet absorption. It has a characteristic absorption peak at 260 nm (nanometers), with a minimum 240 nm. Its decomposition products have an intense absorption at 240 nm, so that it is possible to detect a very small amount of decomposition. Some commercial materials that are not visibly decomposed contain enough of these products to obscure completely all peaks in the range of 230 to 260 nm.

Impure samples of this peroxide are easily purified by recrystallization. Any of several solvents may be used, particularly short-chain alcohols. Methanol is preferred as it permits recrystallization at temperatures at or above 0°C. Still higher temperatures may be used if up to 10 percent of water is present. Generally one recrystallization is sufficient. The product is satisfactorily pure if the absorbance at 240 nm is no stronger than the absorbance at 260 nm.

As indicated above the amount of peroxide used is not critical. Depending somewhat on the equivalent weight of the peroxide, as little as 0.1 percent or as much as 1.5 percent may be used. The preferred range is from 0.3 to 0.8 percent and more preferably about 0.5 percent.

These peroxides are all readily soluble in vinyl-containing silicone fluids and are stable enough that the solutions may be stored for many months at room temperature without decomposition. In the case of normally solid peroxides it is sometimes desirable to preheat the silicone fluid to about 50°C. to facilitate dissolution.

In order to cure the silicone fluid, it is heated with the peroxide for a length of time and at a temperature appropriate to the peroxide. Minimum cures require a time equal to at least one half-life of the peroxide. Better results are obtained after 2 or 3 half-lives, and full cures require at least 5 to 10 half-lives. Longer heating will not cause any bad effects because the silicones are stable at temperatures above 200°C., and the preferred peroxides do not generate acidic by-products. To avoid excessively long cure times, however, it is desirable to choose a temperature such that the half-life is of the order of one to ten minutes. For example, temperatures of 150° to 180°C. for the tertiary alkyl peroxides and 130° to 150°C. for the diperoxy ketals is satisfactory.

The table below illustrates suitable cure times.

| Peroxide | Temp. °C. | Approx. Half-life, Minutes | Time, Minutes |
| --- | --- | --- | --- |
| 1,1-Di-t-butylperoxy-3,3,5-trimethylcyclohexane | 140 | 1 | 30 |
| Dicumyl peroxide | 170 | 1.5 | 15 |
| Bis-(t-butylperoxyisopropyl)-benzene | 170 | 3 | 30 |
| Bis-(t-butylperoxyisopropyl)-benzene | 180 | 1 | 10 |
| Bis-(t-butylperoxyisopropyl)-ethane | 175 | 1 | 15 |

It should be noted that the terms "preferred range" and "optimum range," in reference to the viscosity and vinyl content of the fluid, are used with a particular application in mind; i.e., an impact absorber similar to those described in U.S. Pat. Nos. 3,053,526 and 3,178,037 to Kendall. It should be pointed out, however, that the elastomers of this invention are useful in a great variety of hydraulic devices. Examples include shock absorbers, fluid couplings, braking systems, vibration dampers, rate-control devices and many others. The same elastomers work well in each of these. In some applications the optimum range of usable fluids may be slightly different from those described above. In almost all cases however, it will be found that the optimum range will lie within the boundaries of the preferred range given above. That is, the viscosity of the fluid will lie between 5,000 and 30,000 cp and the value of C in equation (2) will lie between 0.53 and 0.83.

Ideally each elastomer should be tested in the device for which it is designed. In cases where this is impractical the following laboratory test was devised, based on a Brabender Plasti-Corder (C. S. Brabender Instruments, Inc., 50 East Wesley Street, South Hackensack, N.J.). The measuring head used is Type 6/115 volts/114 amp., No. 105, with roller blades. It is preheated to the curing temperature, about 350°F., with the rollers turning at 50 rpm, and the uncured fluid containing peroxide is introduced by means of a Semco hand extruder. A small excess is used to make sure that the cavity is full. The cure is followed by means of a torquemeter. The torque starts to increase noticeably after about 3 minutes. Very shortly thereafter a gel point is reached and the material turns into a fine powder. The torque continues to rise, however, and finally levels off after 10 to 20 minutes. During this time the powder flows around the blades like an extremely viscous liquid. The shear stress is believed to be very similar to that in the actual hydraulic impact absorber. At any rate an elastomer with the right hardness that shows a torque of 1,000 to 1,550 meter-grams will perform well in an impact absorber.

Regardless of the nature of the shearing mechanism the fluidlike properties develop as the elastomer is broken down into small particles. The size of the particles is not critical, but for optimum reproducibility they should be less than one millimeter in diameter.

Hardness is determined with a Shore A durometer on ¼ inch buttons cured, typically, for 25 minutes at 350°F. (ASTMD-395 Method B). Optimum results are obtained if the Shore A hardness is between 11 and 14. Under certain conditions fairly good results may be obtained with elastomers that have a Shore A hardness as low as 9 or as high as 16.

In addition to the physical characteristics of hardness and flow behavior, the cured elastomer may be characterized chemically. It contains an unusually large number of free ends, i.e. terminal segments, that are not involved in the cross-linking process. Given a fluid in the molecular weight range of 20,000 to 200,000 and given that there are two end groups per molecule, the number of end groups can be calculated as lying between 0.074 and 0.74 per 100 silicon atoms. In the preferred range the number of free ends lies between 0.18 and 0.34 per 100 silicon atoms. The optimum fluid molecule, with a molecular weight of 60,000 has 0.25 end groups per 100 silicon atoms; this figure remains essentially unchanged on curing. In the cured elastomer the average length of the free ends is between 50 and 100 silicon atoms.

By contrast, a typical silicone gum molecule, with a molecular weight of around 500,000 has only 0.03 end groups per 100 silicon atoms. The free end groups in the elastomers of this invention are believed to have a plasticizing effect that is important in determining the physical properties of the elastomer.

The cured elastomer, particularly one made from the preferred range of fluids, is further characterized by a relatively high cross-link density. There is normally at least one three-carbon cross-link per original vinyl group. This is true whether curing takes place by repeated free-radical-initiated vinyl addition reactions or by alternating chain-transfer-to-methyl and vinyl addition. More cross-links form, especially in fluids of low vinyl content, by chain-terminating coupling reactions. Neglecting those formed by coupling, the effective cross-link density is given by the expression $$C.D. = \text{"Vinyl"} - E.G./2 \quad (3)$$

where C.D. is the number of cross-links per 100 silicon atoms, "Vinyl" is the original number of vinyl groups per 100 silicon atoms, and E.G. is the number of end groups per 100 silicon atoms. The reason for the last term is that two end groups in effect counteract one cross-link.

The elastomer made from the optimum fluid is thus calculated to have a minimum cross-link density of 0.45 − 0.25/2 or 0.325 cross-links per 100 silicon atoms. The preferred range of fluids gives minimum cross-link densities of from 0.25 to 0.40 cross-links per 100 silicon atoms. Allowing for some cross-links due to coupling, the preferred range of cross-link density is from 0.25 to 0.50 cross-links per 100 silicon atoms.

A typical "prior art" silicone elastomer made from a gum having 0.1 to 0.2 mole percent vinyl has a calculated minimum cross-link density of between 0.098 and 0.198. The novelty of the present elastomers does not reside solely in their high cross-link density, however, but in the combination of high cross-link density and high free end density.

Various embodiments of this invention are further illustrated in the following examples, in which all parts are by weight unless otherwise specified.

EXAMPLE 1

A mixture containing 100 parts of octamethylcyclotetrasiloxane, 0.52 part of mixed cyclic methylvinylsiloxanes obtained from the hydrolysis product of methylvinyldichlorosilane, and 1.46 parts of a short-chain trimethylsilyl-endblocked polydimethylsiloxane having an average of 8.15 silicon atoms per molecule (endblocker), is heated to 85°C. To this is added 0.21 part of a tetramethylammonium siloxanolate solution containing the equivalent of 6.2 percent of tetramethylammonium hydroxide. The viscosity of the mixture begins to increase in a few minutes and equilibration is complete in 1 hour at 85°C. The temperature is then raised to about 140°C. to destroy the catalyst. The product is then stripped for an hour under vacuum to remove a small amount of volatile matter, consisting primarily of an equilibrium quantity of cyclic siloxanes. The product contains 0.45 mole percent of methylvinylsiloxane units, which is essentially the same as in the initial mixture. It is a clear fluid with a viscosity of 12,000 cp at 25°C.

EXAMPLE 2

An impure lot of bis-(t-butylperoxyisopropyl)-benzene, mixed meta and para isomers, having almost complete ultraviolet absorption in the range of 230 to 260 nm at a concentration of 0.08 percent in heptane, is purified in the following manner. It is dissolved in warm methanol and water to give a solution containing 15 parts of the peroxide, 80 parts of methanol and 5 parts of water. The solution is cooled slowly to room temperpature and then to 0°C., and held at 0°C. to complete the recrystallization. It is then filtered through a Buchner funnel. The filter cake thus obtained is substantially dry, containing no more than about 10 percent of water and methanol. It is crushed and finally dried in a stream of nitrogen, giving a yield of recovered peroxide of 75 percent. The recrystallized material, when diluted to 0.08 percent in heptane, shows an 80 percent absorbance at 260 nm and a 65 percent absorbance at 240 nm. Although the peroxide is of a pale buff color, the U.V. absorption is not significantly different from that of a pure white material obtained by repeated crystallization. This once-recrystallized material will be referred to as "the peroxide of Example 2."

EXAMPLE 3

One hundred parts of the fluid of Example 1 is heated to 55°C. To this is added one half part of the peroxide of Example 2. It dissolves quickly and does not recrystallize on cooling. U.V. absorption shows no decomposition of the peroxide. A portion of the mixture is poured into the cavity of an impact absorber. The assembly is then heated for 30 minutes in an oven at 450°F., the internal temperature reaching a maximum of 410°F. This is sufficient for complete cure of the fluid to a soft elastomer. The assembly is then placed in a dynamometer and subjected to repeated compression-retraction cycles, in which the test sample is allowed to cool to room temperature between cycles. The amplitude is such that virtually all of the elastomer is forced through the orifice in the first stroke, thereby being broken into fine particles. These particles will flow back during the retraction phase. The stress-strain curve is virtually the same for all compression-retraction cycles except the first, indicating that there is no further chemical or mechanical breakdown of the elastomer. In each cycle, the energy absorption is sufficient to absorb an impact of 2,000 joules without "bottoming out" or transmitting an excessive force at any time during the cycle.

Another portion of the mixture is placed in the mixing head of the Brabender Plastic-Corder described above, which has been preheated to 350°F. A sharp rise in torque occurs after 3 minutes, reaching 1,200 metergrams in 7 minutes, and finally leveling off at 1,350 meter-grams in less than 20 minutes. When cool, the elastomer is found to be in the form of a soft white powder. This can be compressed by hand into a transparent mass with the appearance of a liquid, but on release of pressure it reverts to the powder, thus proving it to be fully cured.

A third portion is cured for 25 minutes at 350°F. in the form of a 1-inch by ¼-inch button and tested with the Shore A durometer. It is found to have a Shore A hardness of 12.

EXAMPLES 4 TO 15

Fluids are prepared in accordance with the procedure of Example 1, except that the amounts of cyclic methylvinylsiloxane and endblocker are varied to give different viscosities and vinyl contents. After stripping samples are heated in a vacuum oven and found, by weight loss, to contain between 2.3 and 4.2 percent of residual volatile matter, which is an acceptable range. The fluid of Example 15 is the most difficult to strip, because of its relatively high viscosity, and has the highest residual volatiles. Each fluid is mixed with 0.5 percent of the peroxide of Example 2 and cured at 350°F. in accordance with Example 3. The results of the tests are illustrated in the following table.

| Example No. | Viscosity, cp | Mole Percent "Vinyl" | Brabender Test, Meter-grams | Shore A Hardness |
|---|---|---|---|---|
| 3 | 12,000 | 0.45 | 1350 | 12 |
| 4 | 1,100 | 0.75* | 900 | 10 |
| 5 | 5,400 | 0.50 | 1250 | 11 |
| 6 | 5,230 | 0.55 | 1275 | 12 |
| 7 | 5,100 | 0.65 | 1250 | 14 |
| 8 | 8,880 | 0.35* | 1175 | 8 |
| 9 | 10,500 | 0.40 | 1300 | 11 |
| 10 | 12,400 | 0.55 | 1350 | 15 |
| 11 | 10,700 | 0.65* | 1400 | 19 |
| 12 | 11,000 | 0.80* | 1400 | 22 |
| 13 | 13,600 | 1.00* | 1300 | 26 |
| 14 | 19,000 | 0.45 | 1450 | 13 |
| 15 | 25,700 | 0.45 | 1300 | 13 |

It can be seen that all fluids that fall within the optimum range of vinyl content as defined above, give satisfactory results, i.e., Brabender values between 1,000 and 1,550, and Shore A hardness between 9 and 15; all but one, No. 10, fall in the optimum range of hardness, 11 to 14. All those that are outside the optimum range of vinyl content, indicated by asterisks(*), are generally outside the acceptable range of hardness even though some are satisfactory in the Brabender tests.

EXAMPLE 16

A fluid having a viscosity of 87,000 cp and 0.20 mole percent "Vinyl" is cured in the Brabender Plasti-Corder at 350°F. in accordance with Example 3 and gives a final torque of 1,200 metergrams which is acceptable.

EXAMPLES 17 TO 22

A fluid having a viscosity of 140,000 cp and 0.14 mole percent "Vinyl" is cured in the Brabender Plastic-Corder with various amounts of peroxide and at various temperatures as shown in the following table.

| Example No. | Peroxide Percent | Cure Temperature °F. | Torque, Meter-grams |
|---|---|---|---|
| 17 | 0.5 | 350 | 1300 |
| 18 | 0.75 | 350 | 1350 |
| 19 | 0.95 | 350 | 1300 |
| 20 | 1.15 | 350 | 1300 |
| 21 | 0.5 | 400 | 1425 |
| 22 | 0.5 | 450 | 1600 |

It is apparent that increasing the peroxide level has little effect on the final torque. On the other hand very high curing temperatures are undesirable, as indicated by the high torque value in Example 22.

EXAMPLES 23 TO 26

Example 3 is repeated except that 0.5 percent of the following catalysts are used:

Impure bis-(t-butylperoxyisopropyl)-benzene (20 minutes at 350°F.).

1,1-Di-t-butylperoxy-3,3,5-trimethylcyclohexane (30 minutes at 285°F.).

Dicumyl peroxide (15 minutes at 340°F.).

Bis-(t-butylperoxyisopropyl)-ethane (20 minutes at 350°F.).

In all cases the Brabender torque is between 1,300–1,400 meter-grams, and the cured elastomers are indistinguishable in appearance and mechanical properties from that obtained in Example 3.

While specific embodiments of the invention have been described it should not be limited to the particular compositions described herein. Other variations may

What is claimed is:

1. A silicone fluid curable to a hydraulic elastomer, having a viscosity of from 1000 to 1,000,000 centipoises, comprising a copolymer of dimethylsiloxane units with 0.1 to 0.9 mole percent of methylvinylsiloxane units, the mole percent of methylvinylsiloxane units having a value of (4.8/log V) - C, where V is the viscosity in centipoises and C is a number having a value of from 0.53 to 0.83, said copolymer having end groups selected from the class consisting of trimethylsiloxy, hydroxy and alkoxy.

2. The silicone fluid of claim 1, wherein the copolymer is represented by the formula $$RO[(CH_3)_2SiO]_x[CH_3(C_2H_3)SiO]_yR$$

wherein R is selected from the class consisting of alkyl radicals of from one to four carbon atoms, hydrogen and trimethylsilyl radicals, $x$ is a number of from about 270 to about 2,700 and $y$ is a number of from $0.001x$ to $0.009x$.

3. The silicone fluid of claim 1 wherein the copolymer contains trimethylsiloxy end groups and has a viscosity of from 5000 to 30,000 centipoises.

4. The silicone fluid of claim 1 wherein the value of C is from 0.63 to 0.78.

5. The silicone fluid of claim 2 wherein the viscosity is from 10,000 to 15,000 centipoises and the mole percent of methylvinylsiloxane units is approximately 0.45.

6. The silicone fluid of claim 1 which contains in addition 0.1 to 1.5 percent of a curing agent selected from the class consisting of tertiary alkyl peroxides and diperoxy ketals.

7. The silicone fluid of claim 6 wherein the amount of curing agent is from 0.3 to 0.8 percent.

8. The silicone fluid of claim 6 wherein the curing agent is a tertiary alkyl peroxide.

9. The silicone fluid of claim 8 wherein the curing agent is dicumyl peroxide.

10. The silicone fluid of claim 8 wherein the curing agent is bis-(t-butylperoxyisopropyl)-ethane.

11. The silicone fluid of claim 8 wherein the curing agent is bis-(t-butylperoxyisopropyl)-benzene.

12. The silicone fluid of claim 11 wherein the curing agent has an ultraviolet absorbance at 240 nanometers that is no greater than at 260 nanometers.

13. The silicone fluid of claim 6 wherein the curing agent is a diperoxy ketal.

14. The silicone fluid of claim 13 wherein the curing agent is 1,1-di-t-butylperoxy-3,3,5-trimethylcyclohexane.

15. A process for curing the silicone fluid of claim 1 to a hydraulic elastomer which comprises heating said fluid with 0.1 to 1.5 percent of a curing agent selected from the class consisting of tertiary alkyl peroxides and diperoxy ketals at a temperature from 130°C. to 210° C. for a time equal to at least one half-life of the curing agent.

16. The process of claim 15 wherein the curing time is equal to at least 5 half-lives of the curing agent.

17. The process of claim 15 wherein the curing agent is a tertiary alkyl peroxide, the curing temperature is at least 150°C., and the curing time is at least 1 minute.

18. The process of claim 14 wherein the curing agent is a diperoxy ketal, the curing temperature is at least 130°C. and the curing time is at least 1 minute.

19. A hydraulic elastomer composed of a polydimethylsiloxane cross-linked by three-carbon bridges, in which the cross-link density is from 0.25 to 0.50 cross-links per 100 silicon atoms, and in which there are from 0.074 to 0.74 free chain ends per 100 silicon atoms, said free ends having an average of from 50 to 100 silicon atoms each, said elastomer being characterized by a Shore A hardness of from 9 to 15, and being further characterized by its ability to absorb energy by flowing under pressure like a fluid.

20. The hydraulic elastomer of claim 19 in which there are from 0.18 to 0.34 free ends per 100 silicon atoms, and the Shore A hardness is from 11 to 14.

21. The hydraulic elastomer of claim 19 in the form of fine particles which are predominantly less than 1 millimeter in diameter.

* * * * *

UNITED STATES PATENT AND TRADEMARK OFFICE
CERTIFICATE OF CORRECTION

PATENT NO. : 3,843,601
DATED : October 22, 1974
INVENTOR(S) : Leonard Bretz Bruner It is certified that error appears in the above–identified patent and that said Letters Patent are hereby corrected as shown below:

Claim 18, line 1 . . . . .

"14" should be ---15---.

Signed and Sealed this

Third Day of February 1981

[SEAL]

*Attest:*

*Attesting Officer*

RENE D. TEGTMEYER

*Acting Commissioner of Patents and Trademarks*